United States Patent
Best et al.

(10) Patent No.: US 6,955,404 B1
(45) Date of Patent: Oct. 18, 2005

(54) SEQUENTIAL REMOTE DUMPING CONTROL FOR POWER BUGGIES

(75) Inventors: Randall L. Best, Poland, OH (US); R. Bruce Waters, Allison Park, PA (US)

(73) Assignee: Miller Spreader Company, Youngstown, OH (US)

( * ) Notice: Subject to any disclaimer, the term of this patent is extended or adjusted under 35 U.S.C. 154(b) by 37 days.

(21) Appl. No.: 10/777,367

(22) Filed: Feb. 12, 2004

(51) Int. Cl.$^7$ .................................................. B60P 1/00
(52) U.S. Cl. .................................... 298/1 C; 288/22 C
(58) Field of Search ............................... 298/1 C, 19 R, 298/22 R, 22 C, 22 F, 21 R, 21 V, 19 V; 180/212, 242, 247, 305

(56) References Cited

U.S. PATENT DOCUMENTS

| | | | | |
|---|---|---|---|---|
| 2,533,549 A | * | 12/1950 | Bell .............................. | 298/2 |
| 2,690,712 A | * | 10/1954 | Foote ........................... | 417/34 |
| 4,207,022 A | | 6/1980 | Castel | |
| 4,236,757 A | * | 12/1980 | Gregory ................... | 298/22 C |
| 4,270,786 A | * | 6/1981 | Mattox ........................ | 298/3 |
| 4,307,300 A | * | 12/1981 | Kisami ...................... | 307/9.1 |
| 4,523,788 A | * | 6/1985 | Prasad ......................... | 298/11 |
| RE33,131 E | * | 12/1989 | Morrison .................. | 298/1 H |
| 4,898,333 A | * | 2/1990 | Kime et al. ................ | 239/657 |
| 5,360,259 A | | 11/1994 | Lemberger | |
| 5,918,975 A | * | 7/1999 | Hotchkiss et al. ............ | 366/47 |
| 6,155,648 A | | 12/2000 | Dombek et al. | |
| 6,293,627 B1 | * | 9/2001 | Jansen et al. .............. | 298/1 C |
| 6,322,151 B2 | | 11/2001 | Dombek et al. | |
| 6,409,275 B1 | * | 6/2002 | Gerding .................... | 298/22 R |
| 6,619,754 B1 | | 9/2003 | Dombek et al. | |

* cited by examiner

Primary Examiner—Hilary Gutman
(74) Attorney, Agent, or Firm—Harpman & Harpman

(57) ABSTRACT

A hand activated incremental power dumping control for power buggies for enhanced safety and ease of use. A hand control lever mounted on the handle bars of the buggy adjacent the hand grips in which control power elevation and dumping activation can be achieved with incremental engagement locking and safety release mechanism which allows the operator to terminate precise dumping rate and optional hands free continuous dumping operation.

3 Claims, 4 Drawing Sheets

SEQUENTIAL REMOTE DUMPING CONTROL FOR POWER BUGGIES

BACKGROUND OF THE INVENTION

1. Technical Field

This device relates to load transportation machines of the small self-propelled type having a storage bucket thereon generally referred to in the industry as "power buggies". Such devices allow the operator to transport heavy bulky loads over short distances and power dump the contents where needed.

2. Description of Prior Art

Prior art devices of this type are well known within the art as power buggies designed to haul loads up to several tons. Such devices are operated by a single user and are self-contained having an onboard engine and drive capabilities. A storage bucket typically has a hydraulic dumping mechanism that is activated by the operator upon reaching the desired dump area. The controls for operation include forward and reverse with associated throttle control, brakes and storage dumping activation, all available to the operator typically from a central operation console.

Heretofore, dumping controls have been positioned adjacent the control input area and can only be activated by the operator removing their hand from the steering handle bars for activation. Such power buggies and their control features as seen in prior art U.S. Pat. Nos. 4,207,022, 5,360,256, 6,155,648, 6,322,151 and 6,619,754.

U.S. Pat. 4,207,022 is directed to a power vehicle for loading and transporting and unloaded heaped materials. The vehicle, a multiple wheeled frame with self-contained power source and drive assembly, has a dump hopper and scooping configuration associated therewith.

U.S. Pat. 5,360,256 discloses a container and dumping apparatus for use on a motorized vehicle with a resilient release cord associated therewith.

U.S. Pat. 6,155,648 claims a power buggy with bi-directional hand control grips.

U.S. Pat. 6,322,151 shows a power buggy having multiple controls located near the hand grips including a bi-directional twist activation hand grip association.

U.S. Pat. 6,619,754 is on a power buggy that incorporates a kill switch with other controls near the hand grips for operator safety.

SUMMARY OF THE INVENTION

An activation control lever switch assembly on a power buggy for selective continuous and incremental dumping control of the storage and transportation bin thereon. The control lever extends from the handle bar for operator engagement without removing operator's hand therefrom. Sequential locking activation allows for multiple fixed dumping positions with a quick release for return to non-activation or continuous lever control dumping positions.

DESCRIPTION OF THE PREFERRED EMBODIMENT

Figure 1:
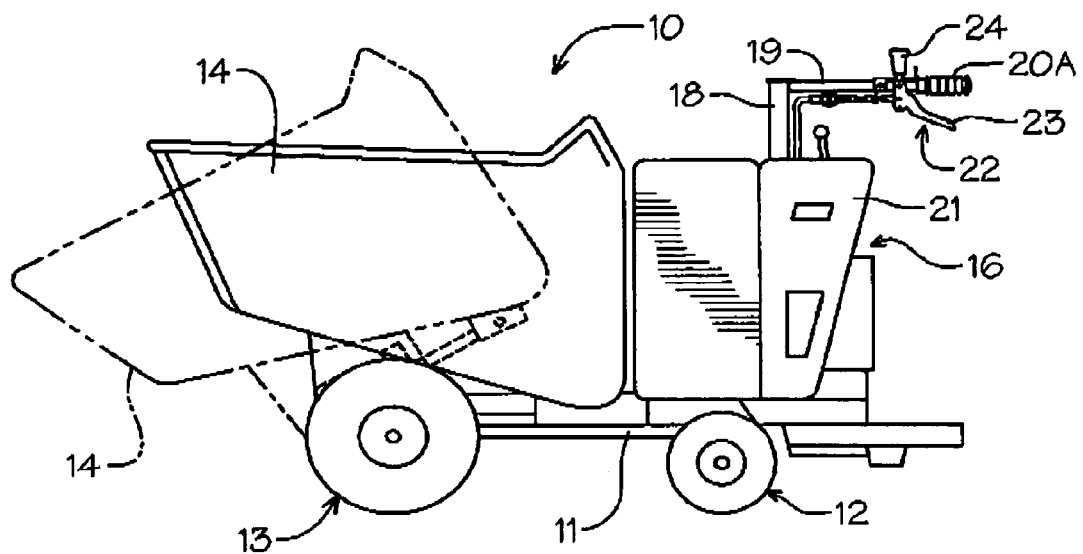
FIG. 1 is a side elevational view of a power buggy equipped with the control dumping lever of the invention.

Referring to FIG. 1 of the drawings, a power buggy 10 is shown having a support frame 11 with multiple wheel assemblies 12 and 13 thereon. A material transport bin 14 is pivotally secured to the frame 11 for controlled tilting and dumping as indicated in broken lines by a hydraulic piston and cylinder assembly 15. The power buggy 10 has a self-contained engine and hydrostatic drive assembly generally indicated at 16.

A steering assembly 17 connects to the dual wheel assembly 12 with an interconnecting steering column 18. A pair of steering and control handle bars 19 extend from the steering column 18 and have respective hand grips 20A thereon in vertical spaced relation to a control support console 21 as will be well understood by those skilled in the art.

Figure 2:
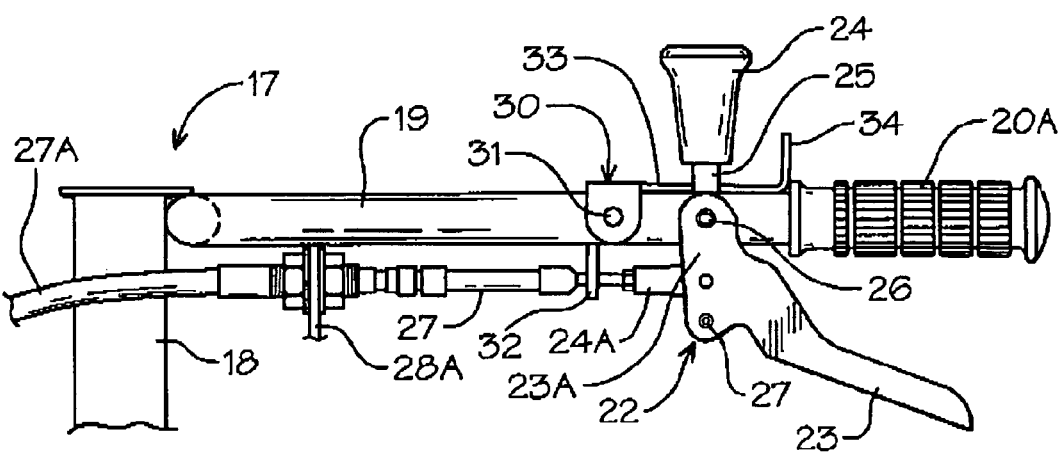
FIG. 2 is an enlarged partial side elevational view of the dumping lever assembly and operator handle bars.
Figure 3:
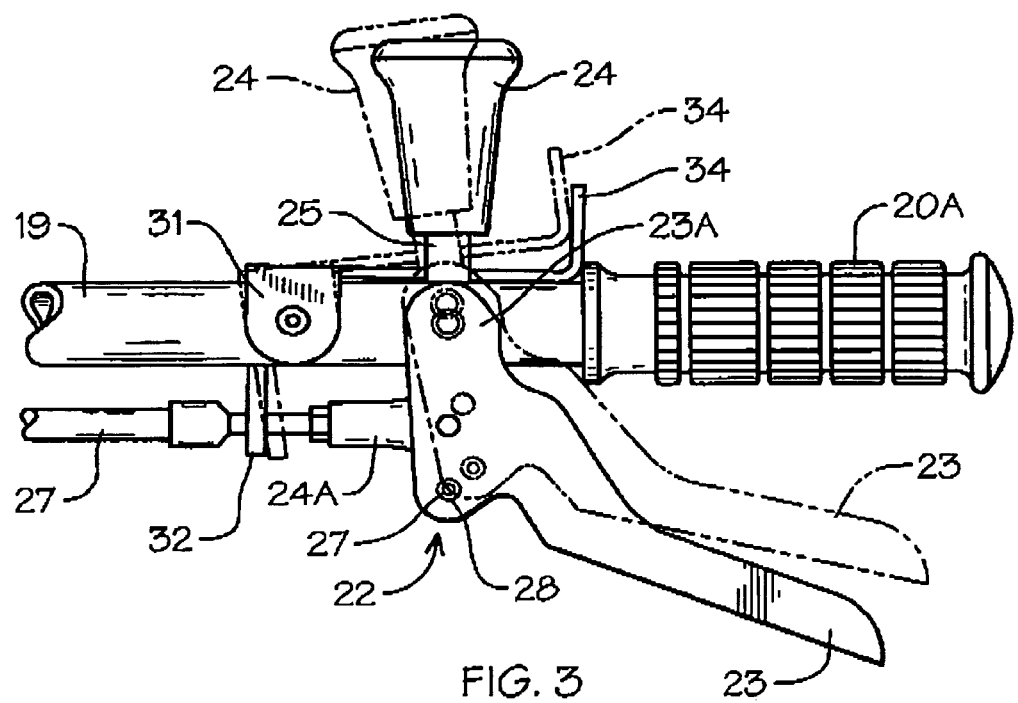
FIG. 3 is an enlarged partial side elevational view of the dumping lever assembly with activation portions illustrated in broken lines.
Figure 4:
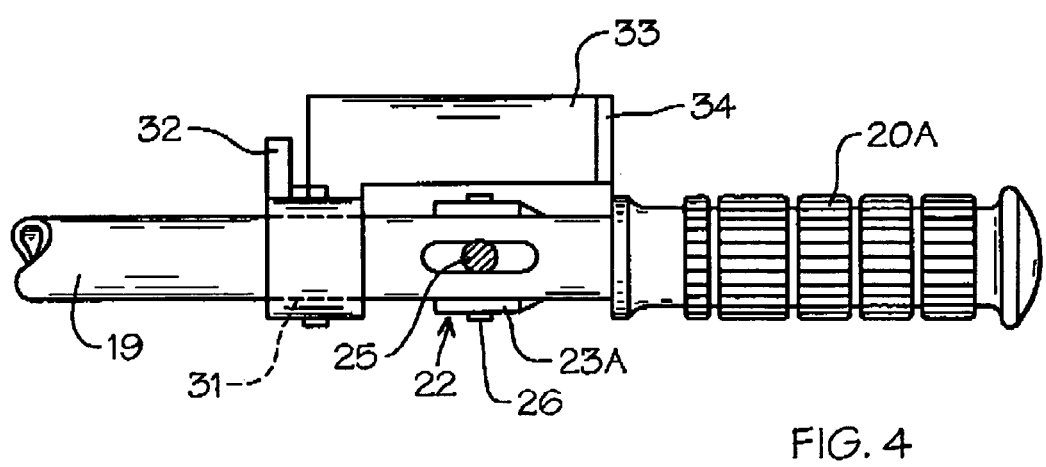
FIG. 4 is an enlarged partial top plan view thereof.
Figure 5:
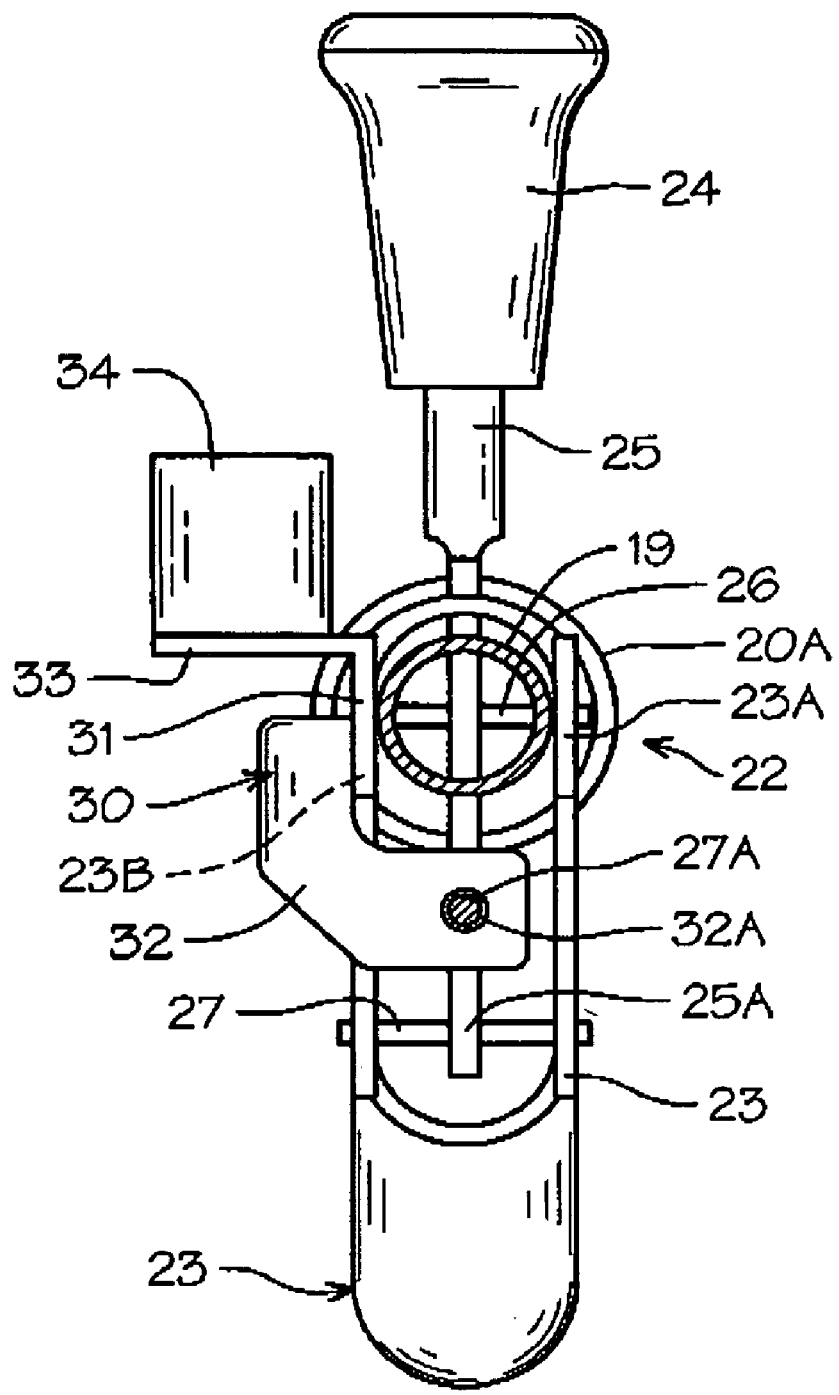
FIG. 5 is an enlarged partial section view thereof.

Referring now to FIGS. 2–4 of the drawings, a dual dump actuation control assembly 22 of the invention can be seen positioned on one of the handle bars 19 adjacent the hand grip 20A. The dump control assembly 22 has a bifurcated hand activated leer grip 23 pivotally secured to the handle bar 19 by respective apertured mounting tabs 23A and 23B in longitudinally spaced relation to the hand grip 20A. A second dump control element is also provided having a dump knob 24 threadably secured to an end of an upstanding control rod 25 that extends through the handle bar 19 and is pivotally secured through a transversely extending main lever support pivot pin 26 as best seen in FIG. 5 of the drawings. The free end 25A of the rod 25 is pivotally secured to a secondary pivot pin 27 extending through oppositely disposed aligned apertures at 28 in the lever grip 23 below the lever support pivot pin 26. This arrangement affords the operator, not shown, a secondary control input which may be applicable in certain situations.

The dump control assembly 22 as illustrated has a cylinder activation control cable 27A extending therefrom that is secured to the lever grip 23 by a fixation fastener 24A. The cable 27A extends through multiple cable mounts 28A and 28B to a cylinder control valve 29, best seen in FIG. 6 of the drawings, for operation of the hydraulic piston and cylinder dump assembly 15. A progressive lock and quick release bracket 30 of the dump control assembly 22 is pivotally secured to the handle bar 19 in longitudinally spaced relation to said hand lever pivot by a pair of depending apertured tabs 31 formed on its end thereof. The locking and release bracket 30 has a cable engagement arm 32 extending from one of its apertured tabs 31. The arm 32 is apertured at 32A through which the cable 27 can freely pass. A limitation lock and release lever 33 extends on a horizontal plane from the hereinbefore described tabs 31 in vertically spaced parallel relation beside the handle bar 19 as best seen in FIGS. 4 and 5 of the drawings.

The lock and release lever 33 has an upstanding engagement tab 34 on its free end which provides the operator, not shown, activation release and selective engagement as will be described hereinafter.

Figure 6:
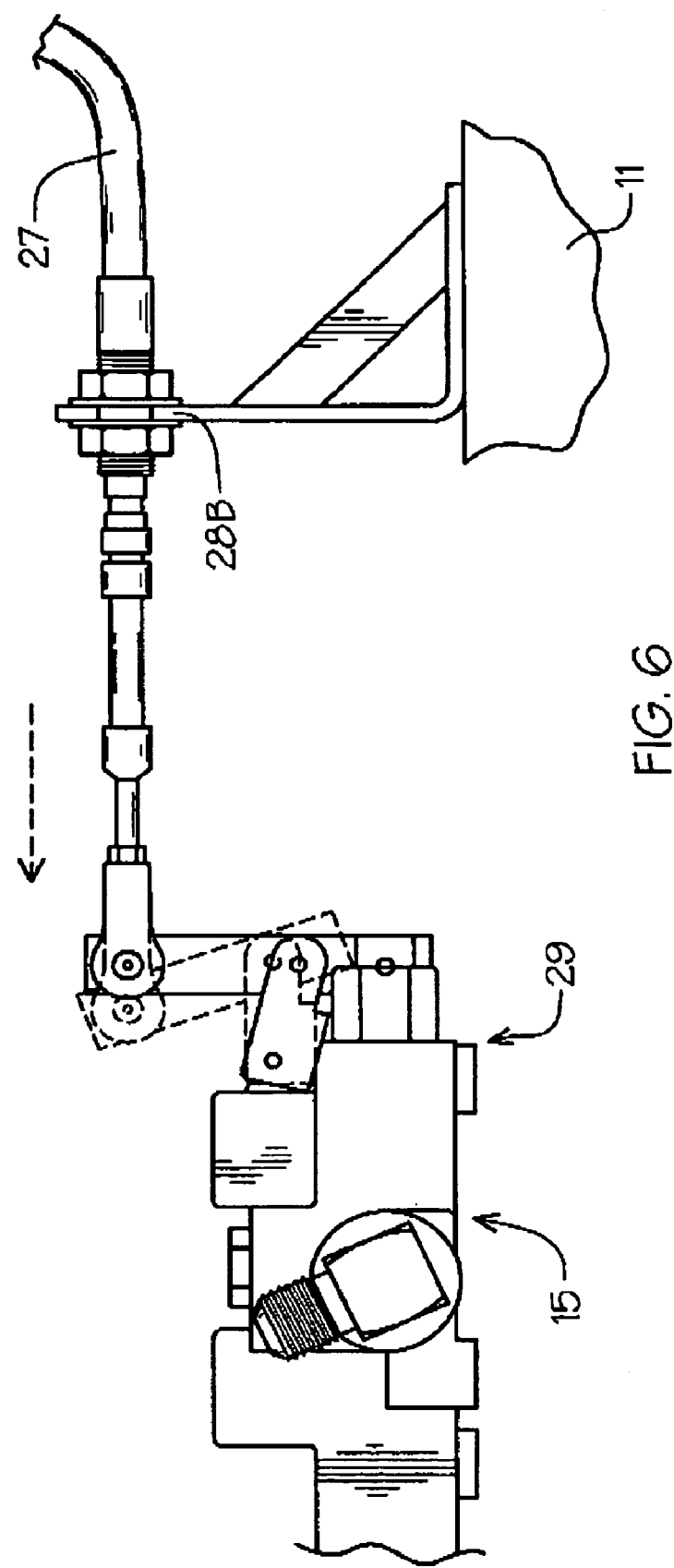
FIG. 6 is a partial side elevational view of the control cylinder of the dumping assembly portions shown in broken lines.

Referring now to FIGS. 3 and 6 of the drawings, the operation of the dump activation control assembly 22 can be seen wherein the lever grip 23 is moved upwardly as indicated in broken lines in FIG. 3 of the drawings and the cable 27 so attached will move the activation cylinder valve 29. Simultaneously the locking and release bracket 30 can be wedgeably engaged on the cable 27 as it extends therethrough holding it in selective position by operator input on the tab 34 as best seen in FIG. 3 of the drawings.

Conversely, the locking and release bracket 30 can be selectively released by the operator, returning the lever grip 23 back to a non-activation fail safe position as shown in solid lines in FIG. 2 of the drawings.

It will be seen that by use of the dual dump activation lever control assembly 22 of the invention, the relative position and therefore degree of operational dumping of material transportation bin 14 can be achieved in continuous or incremental lock position affording a precise continuous control of the material transportation bin 14 during the dumping operation.

It will be apparent to those skilled in the art that various changes and modifications may be made thereto without departing from the spirit of the invention.

We claim:

1. A power buggy comprising,
    a support frame, multiple wheel assemblies on said frame,
    a material transportation bin movably positioned on said frame,
    a steering and control assembly having an operator dump activation lever thereon,
    selective continuous and incremental positioning of said dump actuation lever comprising a progressive locking release bracket having a pair of oppositely disposed aligned apertured mounting tabs, pivotally secured to a handle bar of said buggie,
    an apertured cable engagement bracket extending from one of said tabs,
    a locking release element has an upstanding activation tab on its free end thereof extending from said apertured mounting tabs in spaced parallel relation to said handle bar,
    a power source on said support frame and means for moving said material transportation bin from a first position on said frame to a second dump position and multiple incremental positions therebetween.

2. The power buggy set forth in claim 1 wherein said steering and control assembly comprises,
    a steering column, handle bars extending from said column with oppositely disposed hand grips thereon and said dump activation lever on one of said handle bars adjacent said respective hand grip thereof.

3. The power buggy set forth in claim 1 wherein said means for moving said material transportation bin from a first position on said frame to a second dump position and multiple incremental positions therebetween comprises,
    a hydraulic piston and cylinder assembly pivotally secured to said frame and said transportation bin.

* * * * *